Dec. 7, 1971   D. L. PAINE   3,625,069
CONTROL APPARATUS

Filed Oct. 17, 1969   2 Sheets-Sheet 1

INVENTOR.
DAVID L. PAINE
BY
ATTORNEY

INVENTOR.
DAVID L. PAINE
BY Ronald T. Reiling
ATTORNEY

# United States Patent Office 3,625,069
Patented Dec. 7, 1971

3,625,069
CONTROL APPARATUS
David L. Paine, Minneapolis, Minn., assignor to
Honeywell Inc., Minneapolis, Minn.
Filed Oct. 17, 1969, Ser. No. 867,286
Int. Cl. G01c 19/28
U.S. Cl. 74—5.6        10 Claims

ABSTRACT OF THE DISCLOSURE

A flow direction sensor comprising a surface across which fluid is adapted to flow. A converging-diverging passage extending along an axis perpendicular to the surface connects a circular sensing port in the surface to a fluid sink whereby fluid is drawn through the passage. The passage converges with distance from the sensing port to an area of minimum diameter and then diverges at such an angle that fluid attaches to only a portion of the passage wall depending upon the direction of flow across the surface. A plurality of pressure ports are associated with the diverging portion of the passage for sensing the location of flow attached to the wall thereof.

BACKGROUND OF THE INVENTION

This invention pertains generally to flow direction sensors having no moving mechanical parts, and more specifically to flow direction sensors suitable for determining the orientation of the spin axis in a flueric gyro.

As a result of recent advances in fluids technologies, it has become possible and practical to produce sensing instruments wherein the sensed parameter is manifested in variations in direction of fluid flow. One such application of particular importance is the flueric gyro which basically comprises a housing defining a spherical chamber adapted to contain a spinning fluid mass. Such a gyro contains means for sustaining rotation of the fluid mass about a spin axis which has at least one degree of freedom of orientation while producing a minimum effect on the orientation of the spin axis.. In order to obtain useful information from such an instrument, means must be provided for sensing the orientation of the spin axis relative to the instrument housing. Further, this means for sensing the spin axis orientation must itself produce a negligible effect on such orientation. Further, it must produce an output accurately indicative of such orientation.

One method of sensing the orientation of spin axis of a rotating fluid mass is to sense the direction of flow at the surface of the mass with respect to the instrument housing. The applicant's invention comprises novel apparatus for accurately sensing the direction of flow across a surface without disturbing such flow. This apparatus is particularly well adapted to sensing the direction of fluid flow at a point within a flueric gyro, and hence to determining the spin axis orientation.

SUMMARY OF THE INVENTION

The applicant's unique flow direction sensor comprises a surface across which fluid is adapted to flow. A circular sensing port is provided in the surface and communicates with a diverging-converging fluid passage extending along an axis perpendicular to the surface. The fluid passage first converges with distance from the sensing port to an area of minimum diameter and then diverges with further distance from the sensing port, the angle of divergence being such that fluid flow through the passage attaches to only a portion of the passage wall determined by the direction of flow across the sensing port transverse to the axis. A plurality of pressure ports are associated with the diverging portion of the passage for sensing the location of flow attached to the wall thereof.

DESCRIPTION OF THE PREFERRED EMBODIMENT

Figure 1:
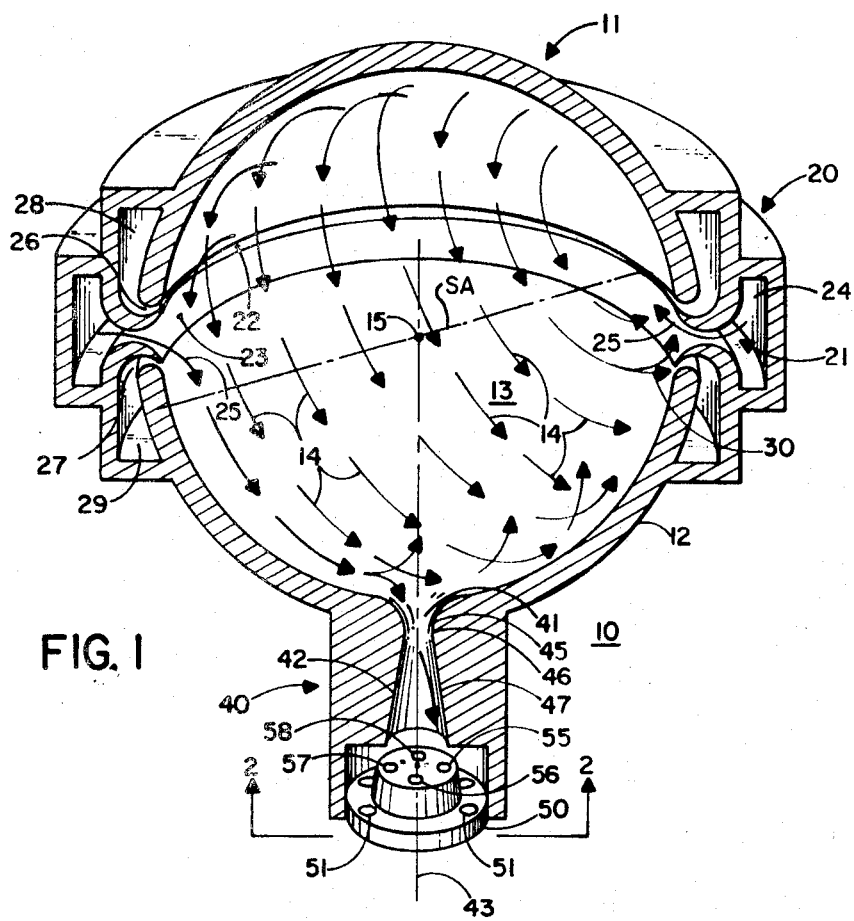
FIG. 1 is a sectional perspective view of one embodiment of the applicant's unique flow direction sensor as applied to a flueric gyro.

In FIG. 1, reference numeral 10 generally identifies one embodiment of a flow direction sensor in accordance with the applicant's invention as applied to a flueric gyro 11. Gyro 11 comprises a housing 12 enclosing a generally spherical chamber 13 adapted to contain a spinning spherical fluid mass whose surface flow is indicated by arrows 14. This surface flow results from rotation of the spinning fluid mass about a spin axis SA extending through center 15 of chamber 13 and lying in a plane containing a great circle of the chamber. An annular nozzle arrangement 20 surrounds chamber 13 and lies in the plane of the great circle. Nozzle arrangement 20 comprises a circumferential opening 21 centered on the plane of the great circle. Central opening 21 is bounded by a pair of walls 22 and 23 which diverge inwardly with respect to chamber 13. Opening 21 communicates with a supply plenum 24 which is provided with fluid under pressure from a source (not shown). Fluid flows from supply plenum 24 into chamber 13 as indicated by arrows 25. Walls 22 and 23 are configured to provide attachment thereto of fluid flow through opening 21 in accordance with the Coanda effect. Fluid flowing into chamber 13 at any point along circumferential opening 21 attaches to one of the walls thereof depending on the direction of flow in chamber 13 adjacent that point.

A pair of circumferential exhaust openings 26 and 27 are provided on opposite sides of central opening 21. Exhaust openings 26 and 27 communicate respectively with exhaust plenums 28 and 29 which are connected to a suitable fluid sink (not shown). Fluid is removed from chamber 13 through exhaust openings 26 and 27 around the entire circumference thereof as indicated by arrow 30.

Nozzle arrangement 20, including central opening 21 and exhaust openings 26 and 27, has a uniform cross-sectional configuration in radial planes perpendicular to the plane of the great circle. Accordingly, the nozzle arrangement provides no preferred orientation of the spin axis in the plane of the great circle. Thus, once established, the spin axis provides an inertial reference from which angular displacement of housing 11 can be sensed.

It is pointed out that the direction of flow on the surface of the spinning fluid mass at any point remote from the plane on which nozzle arrangement 20 is centered is uniquely indicative of the orientation of the spin axis. Accordingly, sensing the flow direction at such a point provides an indication of the spin axis orientation. The applicant has provided a unique flow direction sensor generally identified by reference numeral 40 for sensing such a flow direction. Flow direction sensor 40 comprises a circular sensing port 41 in the inner surface of housing 12. Port 41 communicates with a fluid passage of circular cross-section 42 which is symmetrical about, and extends along an axis 43 passing through center 15 of chamber 13. Axis 43 is, thus, necessarily perpendicular to the surface of spherical chamber 13 at its point of intersection therewith.

Fluid passage 42 comprises a first section 45 which converges with distance from sensing port 41 to an area 46 of minimum diameter. Passage 42 also comprises a second section 47 which diverges with further distance from sensing port 41. The walls of passage 42 are shown smoothly contoured from the inner surface of housing 11 through sensing port 41 and converging section 46 to diverging section 47. However, in some applications, it may be advantageous to provide a step in the wall of passage 42, as for example in the wall of diverging section 47.

The end of passage 42 remote from sensing port 41 contains a cap or plug 50 which will hereinafter be described in greater detail. Passage 42 communicates with a suitable fluid sink through holes 51 in plug 50. The fluid sink is at a lower static pressure than the static pressure within chamber 13, thereby resulting in a flow of fluid through passage 42. The angle of divergence of section 47 of passage 42 is such that fluid flowing therethrough attaches to only a portion of the wall thereof determined by the direction of fluid flow across sensing port 41. Specifically, the fluid stream in section 47 attaches to an area on the wall thereof leading the direction of flow across sensing port 41. This area of attachment is centered on the intersection of the passage wall and the plane parallel to the direction of flow across port 41 containing axis 43.

Plug 50 is provided with a plurality of pressure ports 55, 56, 57 and 58 oriented generally toward sensing port 41, and symmetrically arranged around axis 43. Pressure ports 55, 56, 57 and 58 are loaded at such a radius from axis 43 as will permit a fluid stream attached to the wall of section 47 to impinge on at least one of the pressure ports. Since the fluid stream attached to the wall of section 47 primarily impinges on the one of ports 55, 56, 57, 58 most nearly aligned therewith, pressure differentials are developed between the various pressure ports. These pressure differentials are indicative of the location of the flow attached to the wall of section 47. Further, if four pressure ports are provided as shown in FIGS. 1 and 2, the pressure differentials developed between the various pressure ports are uniquely indicative of the location of the flow attached to the wall of section 47, and hence uniquely indicative of the direction of flow in chamber 13 across sensing port 41.

Figure 2:
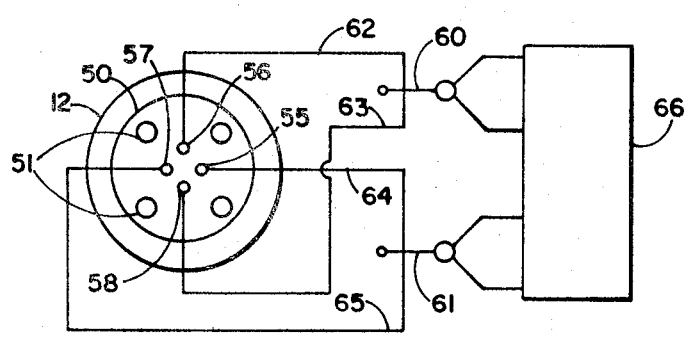
FIG. 2 is a view of the flow direction sensor of FIG. 1 taken along lines 2—2 and showing the connections thereof to a control system including fluid amplifiers.

As shown in FIG. 2, pressure differential signals developed between pairs of pressure ports can be transmitted to fluid amplifiers (identified by reference numerals 60 and 61). FIG. 2 specifically shows pressure ports 56 and 58 connected to opposing control ports of amplifier 60 through conduits 62 and 63. FIG. 2 also shows pressure ports 55 and 57 connected to opposing control ports of amplifier 61 through conduits 64 and 65. The outputs of amplifiers 60 and 61 are supplied to any suitable control system 66. Amplifiers 60 and 61 may comprise a part of such a control system, or may serve only to amplify the signals from the pressure ports to a magnitude suitable for use in a given control system.

Figure 3:
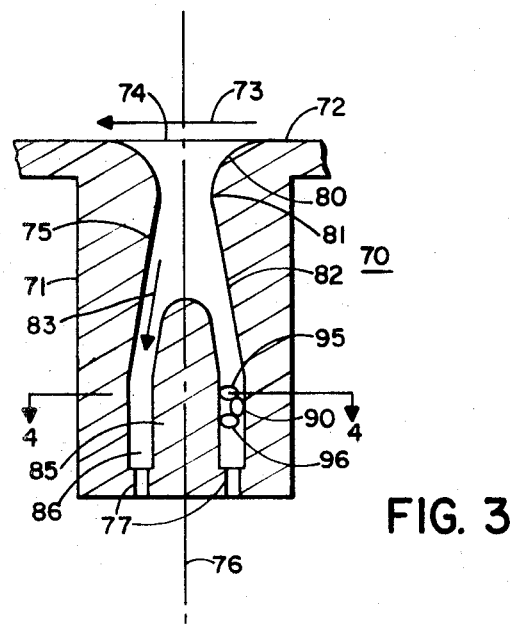
FIG. 3 is a sectional view of an alternate embodiment of the applicant's unique flow direction sensors.
Figure 4:
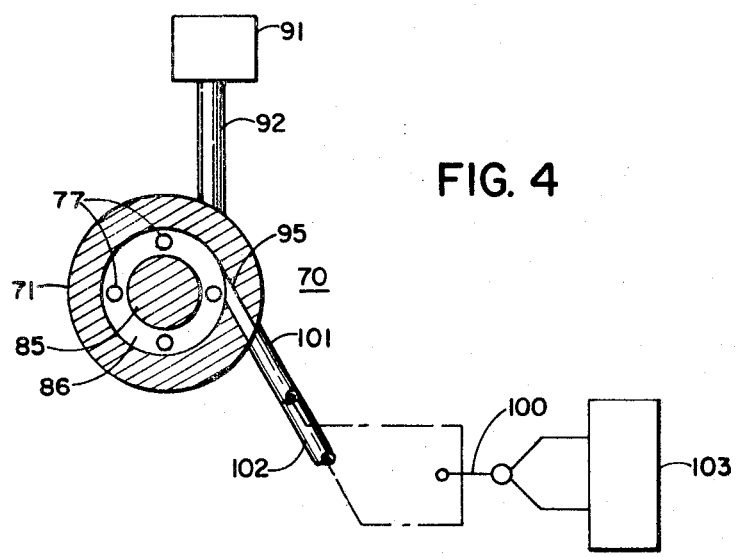
FIG. 4 is a sectional view of the flow direction sensor of FIG. 3 taken along lines 4—4.

A second embodiment of a flow direction sensor in accordance with the applicant's invention is shown in FIGS. 3 and 4. This embodiment is generally identified by reference numeral 70. Sensor 70 comprises a housing 71 having a surface 72 across which fluid at a first static pressure is adapted to flow as indicated by arrow 73. Surface 72 has a circular sensing port 74 therein which communicates with a fluid passage 75 of circular cross-section symmetrical about, and extending along an axis 76 perpendicular to surface 72. The end of passage 75 opposite sensing port 74 communicates with a suitable fluid sink through holes 77 in housing 71. The fluid sink is at a lower static pressure than the static pressure of fluid flowing across sensing port 74, thereby producing a fluid stream through passage 75.

Fluid passage 75 comprises a first section 80 which converges with distance from sensing port 74 to an area 81 of minimum diameter, and a second section 82 which diverges with further distance from sensing port 74. The wall of passage 75 is shown smoothly contoured from surface 72 through sensing port 74 and converging section 80 to diverging section 82. However, as previously indicated in connection with passage 42, it may be advantageous to provide a step in the wall of passage 75. The angle of divergence of the wall of section 82 is such that the fluid stream passing through passage 75 attaches to only a portion of the wall of section 82 as indicated by arrow 83. The portion of the wall of section 82 to which the fluid stream attaches is determined by direction of flow across sensing port 74 transverse to axis 76. Specifically, the fluid stream passing through passage 75 attaches to a portion of the wall of section 82 leading the direction of flow across sensing port 74. The area of attachment is centered on the intersection of the passage wall with the plane parallel to the direction of flow across sensing port 74 and containing axis 76.

The end of passage 75 opposite sensing port 76 is provided with a center body 85 of circular cross-section symmetrical with respect to axis 76. A passage 86 of annular cross-section is thereby formed between the wall of passage 75 and center body 86.

A power nozzle 90 is provided in the outer wall of annular passage 86 and is oriented to direct a fluid jet tangentially into the annular passage. Power nozzle 90 is supplied with fluid from a suitable fluid source 91 through a conduit 92. Power nozzle 90 is thereby enabled to issue a fluid jet which travels circumferentially around annular passage 86 generally in a plane perpendicular to axis 76. A pair of fluid receivers 95 and 96 are also provided in the outer wall of annular passage 86. Fluid receivers 95 and 96 are on opposite sides of the normal plane of the fluid jet issued by power nozzle 90 and are circumferentially spaced from the power nozzle.

It can now be seen that the fluid stream attached to the wall of diverging section of passage 75 transversely impinges on the fluid jet issued from power nozzle 90 at a location between the power nozzle and fluid receivers 95 and 96. This transverse impingement results in deflection of the fluid jet from its normal plane of flow. It has been found that the amount of such deflection depends on the circumferential distance between the power nozzle and the point of impingement. Specifically, the smaller the circumferential distance between the power nozzle and the point of impingement, the greater the deflection of the fluid jet from the power nozzle. Since the relative proportions of the fluid jet from power nozzle 90 received by receivers 95 and 96 depend on the deflection of the jet, the differential signal developed between receivers 95 and 96 is indicative of this deflection, and hence is indicative of the location of attachment of flow to the wall of section 82. As previously described, this location of attachment is indicative of the direction of flow across sensing port 74 transverse to axis 76. Accordingly, the differential signal developed between fluid receivers 95 and 96 is uniquely indicative of the direction of flow across sensing port 74.

As shown in FIG. 4, fluid receivers 95 and 96 may be connected to opposing control ports of a fluid amplifier (identified by reference numeral 100). In FIG. 4, fluid receivers 95 and 96 are shown respectively connected to opposing control ports of amplifier 100 by means of conduits 101 and 102 respectively. The output of amplifier 100 is applied to any suitable control system 103. Amplifier 100 may comprise a portion of such a control system or may be used only to amplify the signals from receivers 95 and 96 to a level suitable for use in a desired control system.

As described in detail in the foregoing discussion, the applicant has provided a unique flow direction sensor suitable for use with modern flueric gyros. This flow direction sensor includes no structural member which extends into the flow whose direction is being sensed. Thus, minimum distortion is caused in the flow whose direction is being sensed. The applicant has further provided a simple flow direction sensor having no moving mechanical parts, and a sensor capable of excellent accuracy. Although certain embodiments of the applicant's invention are disclosed in detail, it will be apparent to those skilled in the art that other structural features and modifications may be employed without departing from the teaching and contemplation of the applicant's invention.

I claim:

1. In combination:
   a flueric gyro comprising housing enclosing a generally spherical chamber adapted to contain a spinning fluid mass;
   a circular sensing port in communication with the spherical chamber and adapted to permit fluid flow therethrough from the chamber;
   a fluid passage of circular cross-section connected to the sensing port and extending outward from the chamber along a radial axis, said fluid passage having a symmetrical configuration about the radial axis comprising a first section which converges with distance from said sensing port to an area of minimum diameter and a second section which diverges with further distance from said sensing port, the first section fairing the chamber with the second section so as to provide a smoothly contoured surface from the chamber into the second section, divergence of the second section being sufficiently great that flow through said passage attaches to only a portion of the wall thereof, the portion of the wall to which flow attaches being determined by the direction of flow in the chamber across said sensing port transverse to the axis; and
   a plurality of pressure ports in communication with the second section of said fluid passage for sensing the location of flow attached to the wall thereof.

2. The apparatus of claim 1 wherein the ports of said plurality of pressure ports are oriented generally toward said circular sensing port and are symmetrically arranged around the axis of symmetry of said fluid passage so that fluid flowing through said fluid passage impinges on at least one of said plurality of pressure ports determined by the location of attachment of flow to the wall of the second section.

3. The apparatus of claim 2 wherein:
   said plurality of pressure ports comprises four pressure ports;
   said four pressure ports are surrounded by a fluid receiver for collecting fluid not impinging directly on any of said plurality of pressure ports; and
   a bleed port communicates with said receiver for removing fluid therefrom.

4. The apparatus of claim 2 further including fluid amplifier means connected to receive signals from said plurality of pressure ports.

5. The apparatus of claim 1 further including:
   a center body of circular cross-section extending into the second section of said fluid passage along the axis thereof so as to form a passage of annular cross-section;
   a power nozzle communicating with the fluid passage of annular cross-section through its outer wall and adapted to direct a fluid jet tangentially into the passage generally in a plane perpendicular to its axis of symmetry, the fluid jet flowing circumferentially around the passage; and
   a pair of receiving ports circumferentially spaced from said power nozzle for differentially receiving the fluid jet therefrom, the relative portions of the fluid jet received by each of said pair of receiving ports depending on the location of attachment of fluid flow to the wall of the second section.

6. Apparatus for sensing the direction of fluid flow comprising:
   a surface adapted for fluid flow thereacross;
   a circular sensing port in said surface, said sensing port being centered on an axis perpendicular to the surface;
   a fluid passage extending along the axis, said fluid passage having a first end in communication with said sensing port and having a second end in communication with a fluid sink thereby providing for a fluid stream therethrough from said first end to said second end, said fluid passage being symmetrical about said axis and comprising a first section which converges with distance from said sensing port to an area of minimum diameter and a second section which diverges from said area of minimum diameter with further distance from said sensing port, the first section fairing said surface with the second section to provide a smooth contour from said surface into the second section, divergence of said second section being sufficiently great that the stream therein attaches to only a portion of the wall thereof, the portion of the wall to which the stream attaches lying generally at the intersection of the portion of the wall leading the direction of flow across said surface and the plane which is parallel with the direction of flow and contains said axis; and
   signal means responsive to the location of attachment of flow to the wall of said second section.

7. The apparatus of claim 6 wherein said signal means comprises a plurality of pressure ports oriented generally toward said sensing port and symmetrically arranged around the axis of symmetry of said fluid passage so that fluid flowing through said fluid passage impinges on at least one of said plurality of pressure ports determined by the location of attachment of flow to the wall of said second section.

8. The apparatus of claim 7 wherein:
   said plurality of pressure ports comprises four pressure ports;
   said four pressure ports are surrounded by a fluid receiver for collecting fluid not impinging directly on any of said plurality of pressure ports; and
   a bleed port communicates with said fluid receiver for removing fluid therefrom.

9. The apparatus of claim 6 further including:
   a center body of circular cross-section extending into the second section of said fluid passage along the axis thereof so as to form a passage of annular cross-section;
   a power nozzle communicating with the fluid passage of annular cross-section through its outer wall and adapted to direct a fluid jet tangentially into the passage generally in a plane perpendicular to its axis of symmetry, the fluid jet flowing circumferentially around the passage; and a pair of receiving ports circumferentially spaced from said power nozzle for differentially receiving the fluid jet therefrom, the relative portions of the fluid jet received by each of said pair of receiving ports depending on the location of attachment of fluid flow to the wall of said second section.

10. The apparatus of claim 9 further including fluid amplifier means connected to receive fluid signals from said pair of receiving ports.

References Cited

UNITED STATES PATENTS

| | | | |
|---|---|---|---|
| 1,841,606 | 1/1932 | Kollsman | 73—515 X |
| 1,841,607 | 1/1932 | Kollsman | 33—204.3 X |
| 3,319,471 | 5/1967 | Hermann | 73—505 |
| 3,454,023 | 7/1969 | Burke et al. | 137—81.5 X |
| 3,509,778 | 5/1970 | Bowles | 74—5.6 |

MANUEL A. ANTONAKAS, Primary Examiner

U.S. Cl. X.R.

73—505